Feb. 23, 1965  J. A. LAWLER  3,171,018
TEMPERATURE CONTROL
Filed March 2, 1961  3 Sheets-Sheet 1
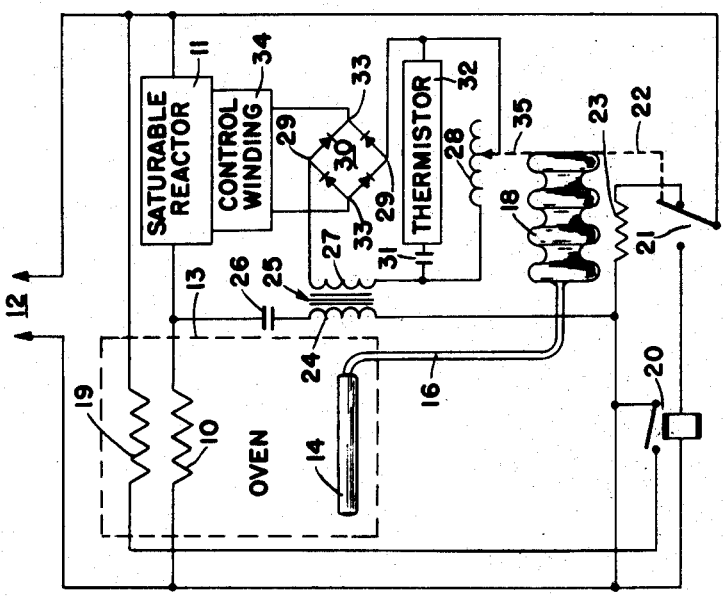
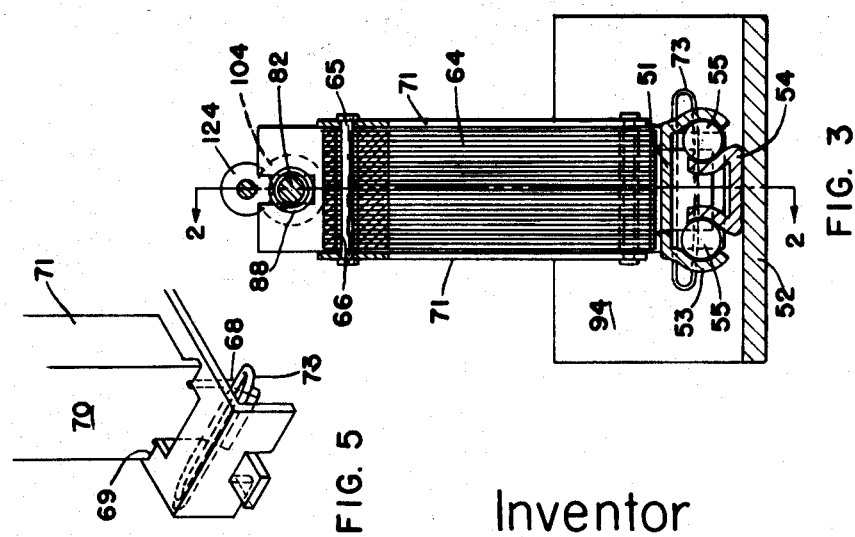
Inventor
Joseph A. Lawler
By *Graf, Nieman & Burmeister,* attys.

Feb. 23, 1965  J. A. LAWLER  3,171,018
TEMPERATURE CONTROL
Filed March 2, 1961  3 Sheets-Sheet 2
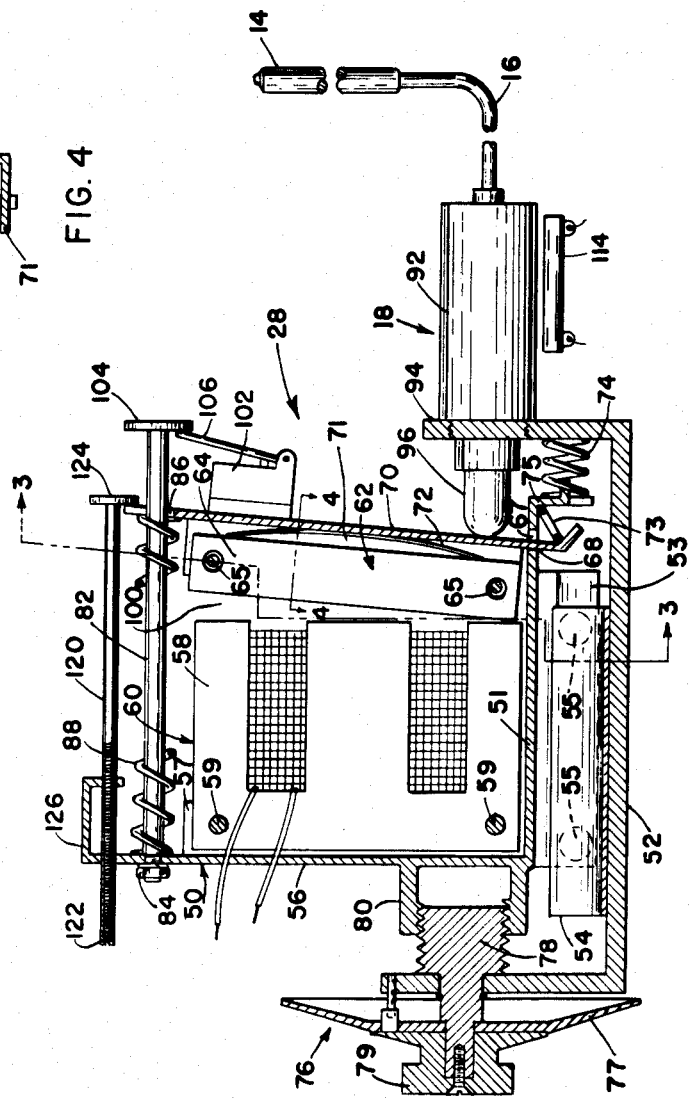
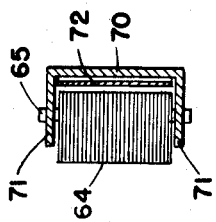
Inventor
Joseph A. Lawler
By *Graf, Norman d Burmeister*, attys.

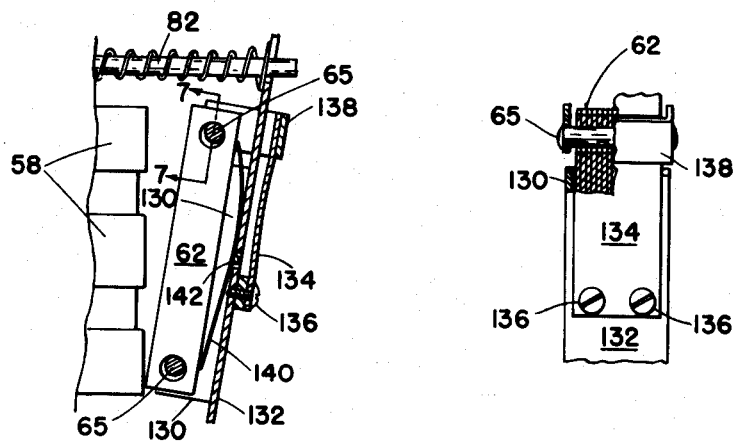
FIG. 6
FIG. 7
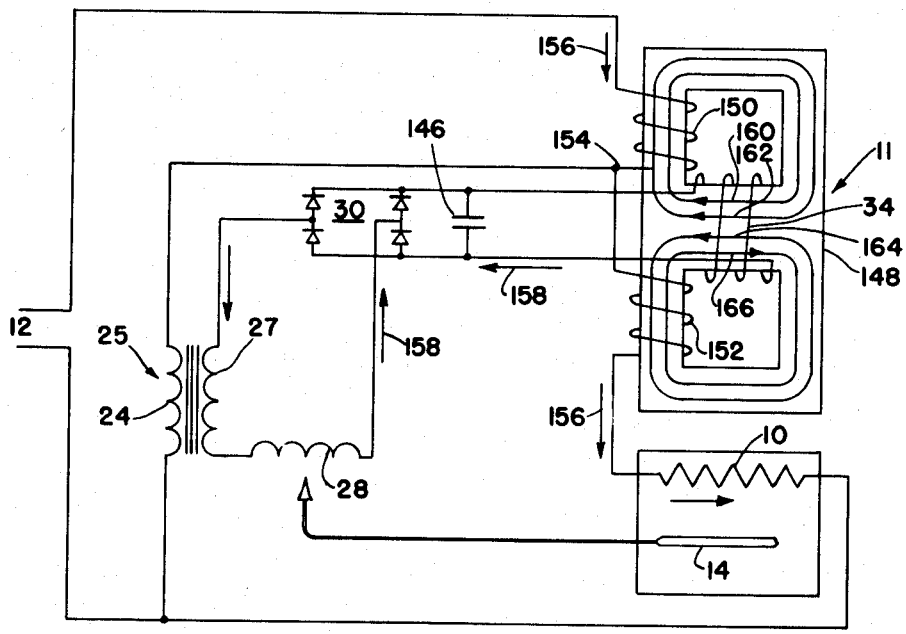
FIG. 8
Inventor
Joseph A. Lawler

United States Patent Office 3,171,018
Patented Feb. 23, 1965

3,171,018
TEMPERATURE CONTROL
Joseph A. Lawler, Chicago Heights, Ill., assignor to Blue M Electric Company, Blue Island, Ill., a corporation of Illinois
Filed Mar. 2, 1961, Ser. No. 94,114
24 Claims. (Cl. 219—494)

This invention relates to a temperature control for ovens, furnaces, and similar enclosures, and more specifically to temperature control of enclosures heated electrically. The present invention is particularly designed for automatic temperature control, over a wide range of temperatures, in systems of one or more kilowatts capacity. The present application is a continuation-in-part of an application filed on December 24, 1959, Serial No. 861,948, now abandoned.

Temperature controls may be broadly classified into two categories, commonly characterized as "on-off" control and "proportional" control. In the former type of system, the heater voltage is switched on and off as the temperature reaches upper and lower limits, in response to the operation of some form of thermostatic switch. In general, the switched element (which may be the entire heat source, or merely one or two of a bank of heating elements) operates at a fixed voltage, generally being connected directly across the line. In such a system, variations of the load are accommodated by variations of ratio of on-time to off-time of the switched element. Such systems are subject to numerous drawbacks, particularly in the case of high-power ovens and furnaces. Such disadvantages (as compared with proportional systems) as inherent variation of temperature between the limits, continual line transients due to the repeated switching of high-power elements, the necessity of the relay systems, etc., required to hold such systems under control with large load variations, particularly with a large range of temperature settings, the limited life of switched heating elements due to repeated thermal shock, and similar problems, are well known.

Proportional control in general involves constant operation of the elements, but with the voltage applied thereto suitably altered to preserve the proper temperature. The disadvantages of on-off thermostatic control mentioned above are avoided in proportional systems. In low-power heating systems, such proportional control may be effected in a simple manner, as by putting a suitable impedance in series with the heating element bank and varying this impedance in some simple fashion, as by mechanical motion produced by a bi-metallic control. In high-power systems, such simple constructions are not practical. The mechanical variation over any certain substantial range of an impedance of sufficient reactance for the purpose having the required volt-amperage rating is a virtual impossibility with any known type of practical device directly producing mechanical motion in response to temperature.

A common manner of varying heater voltage in high-power heating devices is the saturable reactor. In rough functional effect, in ordinary uses, this type of device may be equated to an inductance in series with the heating element, the magnitude being varied by magnetic saturation of the iron core of the reactor, this saturation being produced in controllable degree by an auxiliary control winding fed with direct current. As hereinafter pointed out, this approximation of the overall operation of a saturable reactor is adequate for understanding of the present invention in its broader aspects, although certain features of the invention later to be described require for full understanding of their operation a more precise explanation of saturable reactor operation, which is, as is well known in the art, considerably more complex than would be indicated by the conveniently simple "impedance variation" description of saturable reactor operation which is herein employed in describing some of the basic features of the present invention.

Many systems have been designed and are in common use in which the control current of the saturable reactor is varied in response to the temperature of the heated volume to maintain desired temperatures in response to suitable temperature-sensing devices within the heated space. In general, however, the systems of this type which have been fully practical for the purpose are relatively complex and expensive. Typical systems employ, for example, such sensing elements as thermocouples, which must be followed by suitable power amplifiers to produce the substantial currents required for the control of the high-rating reactors which must be used.

Various simpler schemes have from time to time been proposed for such saturable reactor temperature control. However, simple types of controls, as heretofore devised, have not been practical for use where a large range of temperature values is to be controlled.

Control systems heretofore attempting to avoid the necessity of amplifying thermocouple or resistance thermometer current by employing a temperature-responsive mechanical drive for saturable reactor control have resorted to such complex schemes as various forms of bridges, with or without electronic amplification, to produce the required impedance variation over a sufficiently wide range.

The net result, as evidenced by the proportional controls now commercially available for such purposes, is that no practical wide-range proportional control has heretofore been available which is competitive in cost and reliability with on-off controls for the same general purposes, a large cost differential being required for obtaining the advantages of proportional control in high-power furnaces and ovens designed to be used over wide ranges of temperature, and with widely varying loads.

It is accordingly the principal object of this invention to provide a proportional control for furnaces and ovens and similar enclosures which is capable of controlling high-power heating elements to produce constant temperature over a wide range of pre-settability and at a cost comparable to that of on-off controls for the same general purpose. In the successful accomplishment of this object, there have been developed a number of constructional features which have principal utility in the overall combination by which the principal object of the invention is achieved, but which in some cases may advantageously be employed in other structures.

In the present invention, a number of features of circuit and construction are employed to produce in a simple and inexpensive fashion a full-range proportional temperature control. A variable impedance, driven by a simple form of temperature-sensitive mechanical drive, is placed in the control winding circuit in series with a source of voltage, as in certain systems heretofore devised. However, the range of control current values obtainable from any given variation of the reactance is greatly magnified as compared with the range obtainable from comparably simple impedance variation in constructions heretofore devised. As pointed out more fully below in connection with the description of the embodiments of the invention illustrated in the drawing, this increased range of control for any given impedance variation is accomplished by a novel utilization of a type of regeneration. In addition, advantageous use is made of the impedance properties of reactive circuit elements in combination with the operating characteristics of saturable reactors.

As another aspect of the invention, there is provided a novel form or construction of variable inductance or choke which is combined with a simple form of temperature-responsive mechanical drive (a bellows connected by a capillary to a bulb within the furnace in the illustrated embodiments) to form a simple and effective temperature-responsive variable inductance assembly. Since the simple type of temperature-responsive mechanical drive incorporated in the system of the invention commonly has a portion exterior to the oven, and the temperature to which this exterior portion is exposed (i.e., the ambient temperature of the region in which the control system is placed) will accordingly affect the operation of this drive, provision is made for compensating for errors which would otherwise be introduced by variation in ambient temperature.

As another feature of the combination of the invention, compensation is made of novel fashion for variation in line voltage, which might, because of the regeneration feature, otherwise be slightly more serious than in previous systems.

For a more complete understanding of the above objects and advantages of the invention and ancillary objects and advantages and of the manner in which they are attained, reference is made to the embodiments of the various aspects of the invention illustrated in the annexed drawing in which:

FIGURE 1 is a schematic electrical diagram, partially in block form, and containing a diagrammatic representation of certain mechanical elements, of a temperature control constructed in accordance with the invention;

FIGURE 2 is a view in longitudinal section, taken along the line 2—2 of FIGURE 3, of a variable reactor and temperature-responsive drive assembly constructed in accordance with the invention and constituting a portion of the system of FIGURE 1;

FIGURE 3 is a transverse sectional view, partially in elevation, taken along the line 3—3 of FIGURE 2 in the direction indicated by arrows;

FIGURE 4 is a sectional view taken along the line 4—4 of FIGURE 2 in the direction indicated by arrows;

FIGURE 5 is a fragmentary view in isometric perspective of a portion of the device of FIGURES 2 and 3;

FIGURE 6 is a fragmentary view in side elevation corresponding to a portion of the illustration of FIGURE 2, but showing a further embodiment of the variable reactor or inductor therein illustrated;

FIGURE 7 is an end view of the portion of the device shown in FIGURE 6, partially broken away in section along the line 7—7 of FIGURE 7; and FIGURE 8 is a more or less schematic circuit diagram of a further embodiment of the invention.

Referring to the schematic illustration of FIGURE 1, it will be seen that the heating element 10 (schematically indicated as a single resistance, although a bank of heating elements may be employed) is connected in the fashion now conventional in series with a saturable reactor 11 across the power line 12, the element being located within an oven or furnace schematically indicated by the dotted line 13. A vapor bulb 14 within the oven is connected by a capillary tube 16 to a bellows 18, the state of expansion of which varies with temperature in well-known fashion. An auxiliary heating element 19 is connected across the power line by a relay 20 when the movable contact of a switch 21 is in the left-hand (in the drawing) position. As schematically indicated by the coupling 22, the switch 21 assumes this position when the bellows is contracted, i.e., in the cold condition of the oven.

As further schematically indicated in FIGURE 1, at an early point in the expansion of the bellows 18 from the cold condition of the oven, the switch 21 is snapped to the right-hand position, in which the auxiliary heater 19 is disconnected, and there is connected across the power line a small heating element 23 which is physically adjacent to the bellows 18.

The primary 24 of a step-down transformer 25 is connected in series with a capacitor 26 across the heating element 10. The secondary 27 of the transformer 25 is connected in series with a variable inductance 28 across the input terminals 29 of a full-wave bridge rectifier 30. The variable inductance 28 is shunted by a series combination of capacitor 31 and a negative-temperature-coefficient thermistor 32. The output terminals 33 of the bridge rectifier 30 are connected to the control winding 34 of the saturable reactor 11. As indicated by the dotted coupling 35 in the drawing, the variable inductance 28 is varied by expansion and contraction of the bellows 18, expansion producing increase of inductance.

The basic operation of the system diagrammatically shown in FIGURE 1 may be expressed in simple terms, although as will later appear there are certain unobvious characteristics of the system which render the choice of circuit values rather important although not sharply critical. Considering first only the gross operation, it will be seen that the illustrated system appears regenerative. An increase in voltage across the heating element 10 produces an increase in voltage across the primary 24 of the transformer 25, which in turn produces an increased A.C. voltage in the secondary 27, thus producing an increased rectified D.C. current in the control winding 34, this increase reducing the reactance of the reactor 11 and increasing the voltage across the element 10, thus producing regeneration. The incorporation of the variable inductor in the regenerative loop increases the swing of control winding current, and thus of heating element voltage, which can be obtained with any given swing of inductance. The operation of the bellows produces stability at a temperature dependent on the pre-set relationship between bellows expansion and variable inductance value.

Further pursuing the gross or simplified discussion of the circuit (which introduces no error at the present juncture), it will be seen that when the furnace is first turned on, the position of the switch 21 activates the auxiliary element 19, assisting the heating of the oven, and the heating element 19 remains on until a predetermined temperature is reached, at which point the auxiliary heating element 19 within the oven is turned off, and the small heater 23 adjacent to the bellows 18 is activated. When the pre-set temperature is reached, the temperature at which the oven is maintained will be substantially independent of line voltage changes, since the heat output of heating element 23 adjacent to the bellows 18 is so selected that if the line voltage rises with the device otherwise in equilibrium, the added heat produced by the heater 23 is sufficient to expand the bellows 18 by an amount selected to wholly or partially cancel the effect of the increase of the line voltage on the heat input of the main element 10.

Although the above description of the operation is simple, it may be shown from theoretical considerations, and has been verified by experiment, that this simplicity of explanation is deceptive, and that in fact the operation is a good deal more complex than that simply described above. It is found, for example, that the components of the system must be chosen with considerable care, not only from the standpoint of maximum efficiency and wide-range control of voltages and temperatures, but indeed from the standpoint of commercial practicability. As will be obvious to those skilled in the art, the treatment of saturable reactor operation on the mere linear circuit analysis considerations implicit in considering it as a linear impedance element is inaccurate, since the saturable reactor is in fact a non-linear circuit element somewhat analogous to a switch. Discussion of the operation on a more refined basis will, however, be deferred until completion of the structural description of the embodiments of the invention illustrated in the drawing.

Before proceeding further, however, it may be noted that the thermistor 32 is inserted in the circuit to compensate for the ambient temperature to which the bellows 18 is exposed. It is placed in a location remote from the heater 23. The value and temperature coefficient of the thermistor are matched to the response characteristics of the bellows system to ambient (as opposed to oven) temperatures, so that a rise in ambient temperature reduces the resistance of the thermistor, thus increasing the current in the control winding, and increasing the voltage of the heater for any given bellows expansion. The effects of ambient temperature on the temperature maintained in the oven are thus eliminated or minimized.

FIGURES 2 through 5 show a control assembly corresponding to the bellows 18 and variable inductance 28 of FIGURE 1, which have been incorporated in one commercial embodiment of the device of FIGURE 1, and are highly advantageous in the system of FIGURE 1.

A movable assembly or frame generally designated by the numeral 50 has its bottom portion 51 slideably mounted on a fixed housing bottom 52 by means of concave tracks 53 on the former and concave tracks 54 on the latter, ball rollers 55 being interposed between the facing tracks to permit free-sliding longitudinal to-and-fro motion. The front wall 56 of the movable frame 50 has rearwardly extending ears 57 between which is mounted the stem portion of an E-shaped inductor core 58, by means of pins or rivets 59. The inductor, generally designated by the numeral 60, consists of windings suitably wound on the core 58. The open magnetic flux-paths at the end of the E-core 58 are terminated in an I-shaped or bar-shaped core 62 consisting of individual laminations 64 supported by pins 65, the laminations 64 having apertures 66 somewhat larger than the support pins 65 so that the individual laminations have considerable freedom of movement. The rearward end of the bottom 51 of the movable frame is transversely slotted at 67, this slot receiving a tongue 68 forming shoulders 69 on the supporting arm 70 for the I-core 62, which is supported by the pin 65 on forwardly extending ears 71 on the arm 70.

A leaf spring 72 interposed between the arm 70 and the laminations 64 cooperates with the loose fit of the pin 75 to permit tight and chatter-free engagement of the laminations of the I-core 62 with the ends of the laminations of the E-core 58 when the arm 70 is pivoted to the closed or engaged position of the cores (not illustrated). An oval or loop spring 73 firmly seats the loose pivotal engagement of the arm 70 and the bottom 51 as described above. A coil spring 74 bearing against the downwardly bent end 75 of the bottom member 51 of the movable frame 50 performs a similar function in preventing rattling or end-play between the fixed housing and movable frame.

At the front end of the assembly is a knob and dial combination, generally indicated at 76, consisting of a fixed calibrated dial 77 designed to be mounted on the front panel of a cabinet, a drive screw 78 secured to an external knob 79, and rotatable with respect to the dial 77 and the stationary portion of the assembly, being threaded into a boss 80 on the front wall 56 of the movable frame 50 so that rotation of the knob 79 on the front of a cabinet panel (not shown) moves frame 50 back and forth. Extending back from the front wall 56 of the movable frame 50 in the upper portion thereof above the inductor 60 is a rod 82 having a shouldered threaded front end secured by a nut and washer 84. The upper end of the arm 70 has a notch or aperture 86 passing the rod 82. A coil spring 88 would about the rod 82 is compressed between the rear surface of the front wall 56 and the front surface of the arm 70 to urge the arm 70 and the I-core 62 away from the E-core 58. The bellows, generally indicated by the numeral 18 used in FIGURE 1, is incorporated in a cylinder casing 92 threaded into the rear wall 94 of the fixed housing. A plunger 96 on the end of the bellows engages the arm 70 to drive it, when the bellows expands in response to temperature increase, toward closing the gap 100 between E-core 58 and I-core 62. (It will be understood that the position of plunger 96 illustrated in the drawing is an intermediate position, the plunger being withdrawn when the bulb 14 is cold and being somewhat more advanced than illustrated when stable conditions are being maintained.)

A switch 102 mounted on the arm 70 is operated by abutment of a head 104 on the rod 82 against its operating lever 106 when the arm 70 is in the withdrawn position shown. A heater 114, corresponding to the heater 23 indicated in FIGURE 1, is located adjacent to the bellows 18 to compensate for variations in line voltage, as descirbed above. A rod 120 having a slotted front end at 122 and a head at the rear end at 124 is threaded into a bracket 126 on the front end of the movable assembly.

The operation and advantages of the control assembly shown in FIGURES 2 through 5, when incorporated in the system of FIGURE 1, are in some respects obvious and in other respects more subtle. The desired temperature is set by rotating the knob 79, having a suitable pointer, to the indicated temperature shown on the calibrated dial 77. Assuming the furnace or oven to be cold at this point, the piston 96 is completely withdrawn and the movable assembly moves back and forth under control of the knob with all of the parts mounted on the movable frame 50 remaining in the relative position illustrated.

In this cold condition, the switch 102, corresponding to the switch 21 of FIGURE 1, is in the position wherein the auxiliary heating element 19, used for rapid buildup of temperature, is in the circuit and is actuated when the main switch (not shown) connects the device to the power line. At this point, the arm 70 is at its outermost position on the E-core 58, and the inductance is minimum, this minimum value being fixed by abutment of the upper end of the arm 70 against the head 124 on the rod 120. The voltage across the heating element shortly reaches its maximum value, the main heating element 10 and the auxiliary heating element 19 then heating up the oven and commencing to expand the bellows within the housing 92. The expanding bellows drives the piston 96 into contact with the arm 70 at a temperature somewhat below the control temperature to which the knob 79 has been set. At this point, the arm 70 starts to pivot toward the E-core 58, thus reducing the equilibrium voltage of the heating element 10 and also disconnecting the auxiliary heating element 19 by operation of the switch 102 (corresponding to the switch 21 of FIGURE 1), which simultaneously breaks the circuit of relay 20 and connects the auxiliary heater (23 or 114) into the circuit. The heater 114 has only a relatively small influence on expansion of the bellows 18, being designed only for line-voltage compensation as previously set forth. Ultimately the bellows 18 reaches its final position corresponding to the temperature in the oven or furnace, and the voltage on the heating element is stabilized at the condition dictated by the final position of the I-core 62 (which will vary slightly with heating load but greatly with the setting of the dial 79).

It will be noted that the only force required to be overcome by the piston 96 in moving the arm 70 is that of the small spring 88. This spring, because of the operation of the feedback system described above, can be made relatively light as compared with the force which would be required for the purpose of holding the I-core away from the E-core were there no feedback. The feedback assures that when the I-core is close to the E-core, the current through the inductor 60 is reduced by a much larger factor than could be obtained by the mere rise in impedance of the inductor itself. Thus the magnetic attraction of the E-core for the I-core, which would otherwise require a much larger spring to hold the cores apart when they come close to each other, is minimized by the feedback arrangement, so that it is possible to use a relatively light spring 88 for this purpose, and the power or mechanical force required for the bellows 18 is correspondingly reduced by a large factor. As will also be seen, the pivotal support of the movable core permits the matching of the inductance to any desired bellows.

The construction illustrated also makes possible an important safety feature guarding against serious damage to the oven or furnace load in the event of some failure in the control system, as for example, leakage or other failure in the bulb and bellows system. With the construction illustrated, when the desired oven temperature has been reached, the screw or rod 120 may be moved forward until the head 124 engages the arm 70 and then backed off a short distance to limit the maximum voltage which can be applied to the heating element in the event of bulb or bellows failure, while permitting sufficient latitude for control of load and voltage variations normally to be expected.

In a specific construction of the embodiment of the invention illustrated in FIGURES 1 through 5, the control system was employed with furnaces of one, two, and three kilowatt capacities fed by a 240 volt single phase line. The saturable reactor employed was of conventional construction, being designed for a conventional saturable reactor control system varying the effective or measured voltage on the main heating element between about 12 volts and 230 volts in response to the application of D.C. voltage from 0 to 30 volts to the control winding. The capacitor 26 was 1.0 microfarad, and the transformer 25 was a 240 to 24 step-down transformer. (The same system was also tested with a 240 to 36 volt transformer and the capacitor 26 was found unnecessary.) The capacitor 31 was .25 microfarad (.5 and 1.0 were also found operative, but did not produce as high maximum heater voltages). The variable inductor 28 had a maximum inductance of 14 henrys and a minimum inductance of 1 henry. The thermistor 32 had a resistance of 1000 ohms at 25° C. and a resistance of 18 ohms at 150° C. and was exposed to the same ambient temperature (within a control system portion of the oven console) as the bellows casing 92. This system produced well-regulated temperatures of from 150° F. to 600° F. (corresponding, with normal heating loads, to voltages of from 15 to approximately 220 volts in the steady state). With this set of values, it was found that moving the capacitor 31 from the position illustrated to a position across either the input or output terminals of the rectifier bridge made little if any difference in performance. It was further found that substitution of a much larger capacitor (8 microfarads) in place of the .25 microfarad capacitor at 31 produced inverse action (i.e., increasing equilibrium heater voltage with increasing inductance), proper temperature control under these conditions requiring rearrangement of the bellows coupling.

FIGURES 6 and 7 show a modified form of construction for the variable inductor which has been devised to provide temperature compensation without the requirement of any device such as the thermistor 32 of FIGURE 1, and at the same time to provide a very high degree of compensation for fluctuations in line voltage. In this modification, the portions not illustrated in FIGURES 6 and 7 are the same as those shown in FIGURES 2 through 5, and described above. The E-core 58 and the I-core 62 are of the same construction as previously described. In this embodiment, the switch 102 of FIGURE 2, and the head 104 on the rod 82 are eliminated, it having been found that the auxiliary heater 19 (FIGURE 1) in connection with which these elements are used may be eliminated except where unusually fast start-up is required. The I-core 62 and the pins 65 which support this core are mounted differently than in the previous embodiment. The lower pin 65 is, as before supported on forwardly extending ears 130 on the pivoted arm 132. A bi-metallic strip 134 has its lower end secured by screws 136 to the main web of the arm 132. A generally U-shaped bracket 138 is secured to the upper or free end of the bi-metallic strip 134. The upper ends of the ears 130 are shortened and are replaced in this region by the forwardly extending arms of the bracket 138, and the upper pin 65 is mounted between the arms of this bracket. The leaf spring 140 is generally similar to the spring 72 of the previous embodiment, but for purposes of economy and convenience in assembly, the spring 140 is held in position merely by a lug 142 seated in an aperture in the arm 132.

It will be seen that the temperature-responsive pivotal mounting of the I-core 62 on the arm 132 thus constituted provides ambient temperature compensation in the calibration of the device to compensate for the fact that the expansion condition of the bellows 18 is influenced by ambient temperature. The direction of flexing of the strip 134 is such as to decrease the gap in the inductor core in response to a decrease in ambient temperature, and vice versa. Since the bellows produces an opposite "temperature coefficient" in the operation of the overall device, the net effect is to eliminate any substantial overall effect of ambient temperature on the operation of the control.

In addition to the temperature compensation, a further very important purpose is served by the illustrated manner of supporting the I-core. It will be observed that the strip 134 is not free to assume the position or condition of flexing in response to temperature which it would have in the absence of the mechanical loading imposed on it by the action of the spring 140. The strip 134 accordingly may be considered as a spring exerting a force varying in accordance with the temperature. The exact position of the core 62 with respect to the arm 132 is determined by equilibrium between the opposing forces exerted by the spring 140 and the strip (or spring) 134, the spring 140 being aided by the magnetic attraction between the E-core and the I-core in determining the equilibrium. In the event of an increase in voltage in the system, the magnetic force exerted by the inductor field will, of course, increase, thus changing the equilibrium in the relation between core position and arm position. Further, this change will be magnified by the fact that the decrease in gap accentuates or magnifies the magnetic force exerted on the I-core for any given current in the inductor winding. There is thus accomplished a drastic reduction of the effect of line voltage variation on heater voltage for any given position of the arm 132. Obviously, although the combination of temperature compensation and voltage compensation is highly desirable, the temperature-compensating spring or strip 134 can be replaced by some other form of resilient mounting for the I-core on the arm if only voltage problems are of concern.

FIGURE 8 shows a modified circuit having certain advantages to be described, the form of representation, particularly of the saturable reactor portion shown in mere block form in FIGURE 1, being somewhat more detailed, and including arrows designating current and flux directions to facilitate understanding of the more exact analysis of the underlying theory and mode of operation of the type of circuit involved which will appear later.

As will be seen by comparison of FIGURE 1 and FIGURE 8, in which portions which are identical to the corresponding portions of FIGURE 1 are designated by the same numerals, the most important difference between the two circuits lies in the feed to the primary 24 of the transformer 25. In the circuit of FIGURE 8, the condenser 26 of FIGURE 1 has been eliminated, and the primary 24 is connected across the series combination of the heating element and half of the controlled or gate winding of the saturable reactor. The primary purpose of this alteration is to increase the minimum voltage supplied to the transformer primary, thus increasing the minimum effective voltage supplied to the transformer secondary, for purposes later to be discussed. The nature of the improvement thus effected, together with certain other factors of optimum performance, can be understood only after more detailed consideration of the exact operation of the circuit than has been suggested by the very rough or approximate explanation heretofore given. As an additional difference, the capacitor 31 of FIGURE 1, previously connected across the inductor 28, is replaced by a capacitor 146 across the output of the bridge rectifier 30, i.e., across the control winding 34 of the saturable reactor, this position having been earlier discussed. Since the circuit of FIGURE 8 employs the temperature and voltage compensation device of FIGURES 6 and 7, the thermistor and heater shown in FIGURE 1 for these purposes are eliminated.

The representation of FIGURE 8 is somewhat more complete than that of FIGURE 1 as regards the showing of well-known saturable reactor construction features, in order to facilitate the explanation of the details of operation. For this purpose there are shown the balanced core 148 of the conventional series-type reactor, with the control winding 34 on the central leg, and the substantially balanced gate windings 150 and 152 connected in series at 154. Arrows 156 indiciate the direction of flow of current through the gate windings and the heating element in one half of the cycle of input voltage, and similar arrows 158 show the direction of current flow in the control circuit. It will, of course, be readily understood that the symmetry produces substantially the same operation in each half of the cycle, except that as regards alternating voltages which may appear in the control winding 34, the bridge rectifier 30 acts in a manner similar to an ordinary half-wave rectifier, as may be seen from inspection of the drawing.

FIGURE 8 also illustrates arrowed flux lines 160, 162, 164, and 166, the inner flux lines 160 and 166 in each leg of the core showing the direction of the flux induced by current in the respective gate windings, and the outer flux lines 162 and 164 showing the direction of the flux induced by control winding current. As is well known, in a theoretically perfectly balanced reactor, the flux lines 160 and 166 fully cancel each other in the central leg, so that no current is induced in the control winding by the gate winding in the absence of saturation. In fact, of course, exact balance is not obtained, and a small voltage is commonly produced in the control winding even in the absence of saturation. As will hereafter be shown, this fact is utilized advantageously in the present system.

Certain aspects of the operation are generally similar to those of conventional saturable reactor operation, as set forth in detail in textbooks and other literature, while other aspects are peculiar to the present arrangement. Briefly, in each half-cycle, the saturable reactor "fires," or acts as a short circuit, at a point in the cycle dependent upon the direct current in the control winding. This current consists of two components, the rectified input from the feedback transformer and the direct component of current induced in the control coil by transformer action in the saturable reactor. As previously indicated, if the reactor is perfectly balanced, voltage will be induced in the control winding from the gate windings only during the "conducting" portion of the cycle. In this portion of the cycle, one of the gate windings is decoupled from the control winding by the saturation of its portion of the core, while transformer action occurs between the other gate winding and the control winding. Since the two portions produce transformer action in opposite halves of the cycle, unidirectional pulses in the control winding result.

One of the gate windings acts as a short because of its core saturation; the other acts as a short to the extent that the control winding circuit itself presents negligible impedance, thus producing the effect of a transformer with a shorted secondary during this portion of the cycle. If the impedance in the control winding circuit is negligible, the contribution of this induced current to the total control winding current is much greater than that of the rectified control current received from the control transformer, in any given condition of equilibrium. However the angle of conduction or "firing point," and thus the magnitude of the induced component of current, is itself controlled by the transformer feedback component of current, so that the overall result is, in effect, that the positive feedback occurring through the external circuit is multiplied by a form of positive feedback or amplifier action occurring in the reactor itself. With these two types of accentuation or amplification of the effects of variation of the variable inductor in simultaneous operation, the sensitivity of the power output to relatively small variations in inductance is extremely high. As a result, very small deflections of the movable core produce very large changes in heater power. This sensitivity is further aided by the mechanical coupling between the bellows and the core, described above. Under these conditions, there is an extremely small range of equilibrium core positions corresponding to the entire range between very high and very low heater power, and an even smaller variation of position of the tip of the bellows plunger. Accordingly the response of the system to any change in heating load is extremely fast, and the calibration of the preset temperature as a function of distance between the variable inductor and the body or fixed portion of the bellows varies only negligibly with heating load; it will be seen upon study that extreme sensitivity to small motions of the temperature-responsive mechanical drive must be provided in order that substantially complete compensation may be made for changes in heating load in preserving constant temperature at any given setting, and that the present construction utilizes both electrical and mechanical constructions which cooperate to produce this result.

It will be observed that the capacitor 31 or 146 serves a very important purpose in reducing the impedance of the control circuit appearing at the terminals of the control winding of the reactor. In the absence of these capacitors (or some other provision for achieving the same effect), the unsaturated gate winding does not act as an effective short circuit in each half of the cycle, so that full voltage does not appear across the heater load. The selection of the value of this capacitor, although not highly critical, is nevertheless important for optimum operation. Too low a value of course does not produce sufficiently low impedance. On the other hand apparently because the capacitor, in either position, is effectively in parallel with the variable inductor, too high a value is also found undesirable. The reason for this may be surmised, although the analysis of this highly non-linear and complex circuit is not sufficiently simple to permit ready calculation of the most desirable value. The spectrum of the waveform of voltage induced in the control winding by one of the gate windings upon "firing" of the reactor (i.e., saturation of the other winding) is a complex series of even harmonics of the line frequency, with rather high harmonics predominating in the leading or "firing" edge of each half-cycle. The parallel combination of the inductor and capacitor (most easily understood in the capacitor position of FIGURE 1), although not near resonance at the line frequency, is near resonance at some of the harmonic frequencies, and accordingly presents a high impedance at such frequencies. Empirical selection of capacitor value for the production of maximum power output may be readily made by simple experiment. It is found that in the two positions illustrated, optimum value is approximately the same in either position, thus supporting the explanation of the capacitor action suggested above.

A closely related additional purpose of the capacitor is believed to flow from the fact that the hysteresis loop, assumed in textbooks to be square, is in fact not so; the capacitor, permitting the high-frequency leading edge of the "firing" waveshape to produce heavy current in the control winding, increases the maximum conduction angle that can be obtained. It will be observed that the variable inductor, in addition to serving the control function, also filters the feedback voltage from the control transformer. When it is by-passed by the capacitor, as in FIGURE 1, this filtering action is reduced for the high-frequency components in the leading or "firing" portion of the conduction cycle, thus aiding the induced control-winding current in producing rapid progress of the saturation process through the "rounded" portion of the magnetization characteristic which exists in practical materials, thus again increasing the effective maximum conduction angle of the saturable reactor. Obviously other arrangements may be used to produce an increase in the rate of rise of current to accelerate the saturation process. By-passing the halves of the gate winding for the high frequency component by capacitors of suitable value, for example, may serve the additional function of confining a portion of the normal magnetizing current to the parallel reactive circuit thus formed and also of effectively eliminating the impedance of the unsaturated half for the abrupt portion of the waveform, thus broadening the control range at both ends; due care of course must be taken to assure that stability is not impaired.

An additional factor in design of the system relates to the manner in which the operation is "started," the discussion thus far assuming that full operating conditions have been reached. Considering first the circuit of FIGURE 1, in which the feedback voltage is taken solely from the load, it will be seen that the system could not "start" if the saturable reactor did not, at the commencement of operation, provide sufficient alternating voltage to the transformer to provide, when rectified, sufficient direct current in the control winding to produce some degree of saturation of the gate windings in some minimum portion of the cycle. Under these conditions, upon the application of power to the circuit, the heater power would remain at the small value it possesses with an unenergized control winding. It would, of course, be possible to assure starting by inserting some small constant voltage or current in the control circuit, for example directly from the power line. A somewhat similar effect is obtained with a small unbalance in the gate windings, which produces a small alternating voltage in the control winding in the unsaturated condition of the reactor, this voltage being rectified in the rectifier bridge. In addition, such an unbalance permits the obtaining of somewhat higher output power.

In order to permit assurance of "starting" despite minor variations of reactor balance and similar characteristics in production, the circuit of FIGURE 8 takes the feedback voltage across the series combination of the heater and one of the two gate windings of the reactor, so that the effective feedback voltage is larger than would be obtained across the heater alone. It will be seen that with this arrangement, the feedback factor is somewhat reduced, i.e., the variation in effective feedback voltage to the transformer is substantially less than proportional to the variation of effective heater voltage, although it remains in the same direction. However, due to the mechanical and electrical construction factors already discussed, it is found that any diminution in sensitivity of the output power to small position changes of the variable inductor is not sufficient to introduce objectionable variations in calibration with normal heating loads.

As previously indicated, the skill of the art will readily devise other systems of control employing the teachings of the present invention. Accordingly, the scope of the protection to be afforded the invention should not be limited to the particular embodiments disclosed, but solely by the definitions of the invention contained in the annexed claims.

What is claimed is:

1. In a temperature control system, a heating element, a saturable reactor having a controlled winding in series with the element and a control winding, a transformer having a primary in circuit across the heating element and having a secondary in series with an inductor and the input of a bridge rectifier, the output of the bridge rectifier being connected to the control winding, the inductor having an E-shaped core, an I-shaped core mounted for motion toward and away from the open end of the E-shaped core, a temperature responsive bellows having a piston thereon engaging the I-shaped core, a screw moving the inductor toward and away from the piston, and a calibrated dial associated with the screw.

2. A condition-control system for a condition responsive to a load voltage comprising a saturable reactor having a controlled winding in series with the load and a control winding substantially entirely controlling the effective impedance of the controlled winding, and a positive feedback control circuit including a rectifier and having input energized primarily by the load and an output constituting substantially the sole source of current to the control winding of the saturable reactor, an inductance in the control circuit variable to vary the feedback and mechanical means for varying the inductance in accordance with the condition controlled.

3. The condition-control system of claim 2 wherein the control circuit input comprises a transformer connected at least partially across the load.

4. The condition-control system of claim 2 wherein the rectifier is a bridge rectifier having its input terminals in series with the inductance and its output terminals in series with the control winding.

5. A saturable reactor control unit comprising
 (a) a saturable reactor having a controlled winding and a control winding, and a load element in a series circuit with the controlled winding for control of the power delivered to the load element,
 (b) a positive electrical feedback circuit connected between a portion of said series circuit, including at least a portion of the load element, and the control winding and providing substantially the sole variable control signal for the saturable reactor,
 (c) said positive feedback circuit including a mechanically variable circuit element and means for producing variation of the feedback factor in correspondence to variation of the circuit element,
 (d) and movable mechanical means for varying the circuit element to vary the feedback factor and adjust the power delivered to the load element.

6. The control unit of claim 5 having
 (e) the circuit element so varied being an inductor having a core with a gap,
 (f) the feedback factor varying in the same direction as the size of the gap so that the variation in magnetic force caused by variation of the distance across the gap is reduced by corresponding variation of the input signal to the feedback circuit.

7. A temperature control comprising
 (a) a saturable reactor having a controlled winding and a control winding, and a heating element in a series circuit with the controlled winding,
 (b) positive feedback means connected between a portion of said series circuit, including at least a portion of the heating element, and the control winding and providing substantially the sole variable control signal for the saturable reactor,
 (c) said positive feedback means including a variable circuit element and means for producing variation of the positive feedback factor in correspondence to variation of the circuit element,
 (d) and means to vary the circuit element in response to variations of temperature in a region heated by the heating element.

8. A temperature control comprising
 (a) a saturable reactor having a controlled winding and a control winding, and a heating element in a series circuit with the controlled winding,
 (b) a positive electrical feedback circuit connected between a portion of said series circuit, including at least a portion of the heating element, and the control winding and providing substantially the sole variable control signal for the saturable reactor,
(c) said positive feedback means including a variable circuit element producing variation of the positive feedback factor,
(d) and a temperature-sensitive element having a sensing portion adapted for insertion in a region heated by the heating element and a portion movable in accordance with temperature sensed,
(e) the movable portion of the temperature-sensitive element varying the circuit element in the direction to decrease the feedback factor in response to increase of temperature.

9. The control unit of claim 8 having
(f) the circuit element so varied being an inductor having a core with a variable gap,
(g) and at least one capacitor connected in circuit with the inductor to increase the change of feedback factor in response to alteration of inductance,
(h) the feedback factor decreasing with decrease of the gap throughout the range of control and decreasing most rapidly in the region where the gap is small,
(i) and the temperature-sensitive element being a bulb-actuated bellows.

10. A temperature control unit comprising
(a) a saturable reactor having a controlled winding and control winding, and a heating element in a series circuit with the controlled winding,
(b) positive feedback means connected between a portion of said series circuit, including at least a portion of the heating element, and the control winding and providing substantially the sole variable control signal for the saturable reactor,
(c) said positive feedback means including a variable impedance producing variation of positive feedback factor with motion of an operating member thereon,
(d) a temperature-sensitive mechanical drive element having a sensing portion adapted for insertion in a region heated by the heating element and a drive portion adapted to vary the impedance,
(e) and biasing means urging the operating member on the impedance in the direction to increase the feedback factor and thus the power output of the heating element, the drive portion of the temperature-sensitive element engaging the operating member to decrease the feedback factor in response to increase of temperature.

11. A temperature control unit comprising
(a) a saturable reactor having a controlled winding and a control winding, and a heating element in a series circuit with the controlled winding,
(b) a positive feedback circuit having an input connected across a portion of said series circuit including at least a portion of the heating element,
(c) a full-wave bridge rectifier in the feedback circuit having output terminals feeding the control winding,
(d) a variable inductor in series with the input to the rectifier, said variable inductor comprising relatively movable core portions, a spring urging the portions apart with force sufficient at all times to overcome the magnetic attraction therebetween, and stop means limiting relative motion under such urging,
(e) at least one capacitor in the positive feedback circuit maximizing the variation of feedback with variation of inductance in the region closely adjacent to the maximum inductance reached upon full engagement of the core portions, the feedback decreasing with increase of inductance throughout the entire range of control,
(f) a temperature-sensitive bellows assembly having a sensing portion and an expansion portion,
(g) the expansion portion driving the core portions together against the urging of the spring with increase in temperature,
(h) a track mounting the inductor for motion toward and away from the bellows assembly,
(j) and a screw positioning the inductor on the track at varying spacings from the bellows in the cold condition and having a calibrated temperature dial thereon,
(k) the positive feedback providing substantially the sole control signal of the saturable reactor.

12. The temperature control unit of claim 11 having the positive feedback circuit input connected across the heating element and a portion of the controlled winding.

13. A temperature control unit comprising
(a) a saturable reactor having a controlled winding and a control winding, and a heating element in a series circuit with the controlled winding,
(b) a transformer having a primary connected across a portion of said series circuit including at least a portion of the heating element, the energizing of said primary increasing and decreasing with increase and decrease, respectively, of the energizing of the heating element and the latter increasing and decreasing with increase and decrease, respectively, of the energizing of the control winding,
(c) a full-wave bridge rectifier having input terminals fed by the secondary of the transformer and output terminals feeding the control winding to provide positive feedback,
(d) a variable inductor in series with the secondary of the transformer controlling the feedback factor, said variable inductor comprising the E-core and an I-core pivotally mounted near one end for motion with respect to the E-core, a spring urging the I-core away from the E-core with force sufficient at all times to overcome the magnetic attraction therebetween, and stop means limiting motion of the I-core under such urging,
(e) at least one capacitor in the positive feedback circuit maximizing the variation of feedback with variation of inductance in the region of motion closely adjacent to the maximum inductance reached upon full engagement of the cores, the feedback decreasing with increase of inductance throughout the entire range of control,
(f) a temperature-sensitive bellows assembly having a sensing portion and an expansion portion,
(g) the expansion portion driving the I-core adjacent to the pivot point to maximize the increase of inductance with increase of expansion against the urging of the spring,
(h) a track mounting the inductor for motion toward and away from the bellows,
(i) and a screw positioning the inductor on the track at varying spacings from the bellows in the cold condition and having a calibrated temperature dial thereon, the positive feedback providing substantially the sole variable control signal of the saturable reactor and acting with said maximizing of the change thereof by the bellows with temperature to make the control highly sensitive to small temperature changes while at the same time minimizing the inherent temperature calibration change due to changes in load, the spacing in the cold condition delaying reduction of power until equilibrium temperature is approached, and the positive feedback reducing the input to the transformer secondary at highest inductance values, thus reducing the increase of magnetic attraction between the I-core and the E-core at such highest inductance values.

14. A temperature control unit comprising
(a) a saturable reactor having a controlled winding and a control winding, and a heating element in a series circuit with the controlled winding,
(b) a transformer having a primary connected across a portion of said series circuit including at least a portion of the heating element, the energizing of said primary increasing and decreasing with increase and decrease, respectively, of the energizing of the heating element and the latter increasing and decreasing, respectively, with increase and decrease, respectively, of the energizing of the control winding, (c) a full-wave bridge rectifier having input terminals fed by the secondary of the transformer and output terminals feeding the control winding to provide a positive feedback circuit, (d) a variable inductor in series with the secondary of the transformer controlling the feedback factor, said variable inductor comprising an E-core and an I-core pivotally mounted near one end with respect to the E-core, a spring urging the I-core away from the E-core with force sufficient at all times to overcome the magnetic attraction therebetween, and stop means limiting motion of the I-core under such urging, (e) said stop means being manually variable to adjustably limit the heat input, (f) at least one capacitor in the positive feedback circuit maximizing the variation of feedback with variation of inductance in the region of motion closely adjacent to the maximum inductance reached upon full engagement of the cores, the feedback decreasing with increase of inductance throughout the entire range of control, (g) a temperature-sensitive bellows assembly having a sensing portion and an expansion portion, (h) the expansion portion driving the I-core adjacent to the pivot point to maximize the increase of inductance with increase of expansion against the urging of the spring, (j) a track mounting the inductor for motion toward and away from the bellows, (k) a screw positioning the inductor on the track at varying spacings from the bellows in the cold condition and having a calibrated temperature dial thereon, (l) the I-core comprising a pivoted mounting member having transversely extending pins mounted thereon, core laminations having apertures loosely mounting the laminations on the pins, and spring means urging the laminations toward engagement with the E-core, so that the laminations may smoothly engage with the core, (m) and supplementary means responsive to ambient temperature to adjust the feedback to hold the equilibrium temperature relatively independent of ambient temperature, the positive feedback providing substantially the sole variable control signal of the saturable reactor and acting with said maximizing of the change thereof by the bellows with temperature to make the control highly sensitive to small temperature changes while at the same time minimizing the inherent temperature calibration change due to changes in load, the spacing in the cold condition delaying reduction of power until equilibrium temperature is approached, and the positive feedback reducing the input to the transformer secondary at highest inductance values, thus reducing the increase of magnetic attraction between the I-core and the E-core at such highest inductance values.

15. The temperature control unit of claim 14 having the transformer connected across the heating element and a portion of the controlled winding, the supplementary means responsive to ambient temperature to adjust the feedback comprising a bimetallic member mounting at least one of said pins on the pivoted mounting member.

16. A temperature control unit comprising (a) a heating element, (b) a temperature-responsive mechanical drive member, (c) an inductor having a magnetic flux path including a gap and a core piece movably mounted for variation of the gap, (d) the drive member engaging the movable core piece to alter the magnitude of the gap in response to variation of temperature, (e) the inductor being in a circuit having an input voltage supply and an output voltage and means responsive to variation of the gap to vary the output voltage in the same direction as the gap, (f) and means responsive to variation of the output voltage to alter the power input to the heating element in the direction to restore the size of the gap and to alter the input voltage supply in the same direction as the output voltage, the altering of the input voltage supply reducing the magnetic force on the core piece in the region of small gap in addition to increasing the sensitivity of control.

17. The device of claim 16 wherein the core piece is pivotally mounted and the drive member engages the core piece near the pivoted end thereof so that large inductance variation is obtained from relatively small motion of the drive member, with a minimum of stress on the drive member.

18. The device of claim 16 wherein the core piece comprises a supporting member and a laminated structure having individual laminations thereof mounted on the support member for limited relative sliding motion in the direction of the gap, individual laminations thus smoothly engaging the stationary portion of the flux path as the gap is closed.

19. In a temperature-control circuit (a) a heating element, (b) a saturable reactor having a controlled winding in series with the element and a control winding, (c) temperature-sensing means exposed to the controlled temperature and having a mechanical drive portion positioned in accordance therewith, (d) a circuit including an inductor and the control winding and having a voltage supply derived at least partially from the voltage of the heating element, the inductor having a core-piece adapted to vary its inductance and spring means biasing the core-piece to a maximum inductance value, (e) the energization of the control winding decreasing with increase of the inductance, (f) the drive portion of the temperature-sensing element being spaced from the inductor in the quiescent condition and engaging the inductor against the force of the spring means to increase its inductance in response to increase of temperature and to decrease its inductance in response to decrease of temperature.

20. The device of claim 19 having calibrated means to vary the spacing between the inductor and said drive portion in the quiescent condition to fix the temperature control point.

21. In a temperature control system, (a) a heating element, (b) a saturable reactor having a controlled winding in series with the element and a control winding, (c) a voltage source and a variable impedance element in circuit with the control winding, the variable impedance element having an operating member spring-biased to a position of maximum energization of the control winding, (d) a temperature-responsive mechanical adjusting member spaced from the operating member in the cold condition and striking the operating member in response to temperature increase to reduce the energization of the control winding until equilibrium is reached, (e) and manually operable means to vary the distance between the cold position of the temperature-responsive adjusting member and the operating member of the variable impedance to set the control temperature.

22. The temperature-control system of claim 21 having:
(f) the variable impedance element being an inductor having an I-core and an E-core, the I-core being pivotally mounted with respect to the E-core,
(g) the mechanical adjusting member being a bellows assembly striking the I-core near the pivot point.

23. The temperature control system of claim 22 having:
(h) the I-core comprising an arm bearing core laminations resiliently connected thereon to yield slightly to magnetic attraction from the E-core, the inductance at any given position of the arm thus varying slightly with line voltage to partially compensate the effects thereof on calibration.

24. The temperature control system of claim 23 having:
(i) the resilient connection comprising a bimetallic spring advancing and withdrawing the laminations in accordance with ambient temperature.

References Cited by the Examiner
UNITED STATES PATENTS

| | | | |
|---|---|---|---|
| 2,079,466 | 5/37 | Phillips | 219—491 |
| 2,133,919 | 10/38 | Fries | 336—135 |
| 2,266,608 | 12/41 | Kuehni | 336—30 |
| 2,276,822 | 3/42 | Bowman et al. | 219—503 |
| 2,293,502 | 8/42 | Hermann | 336—30 X |
| 2,610,287 | 9/52 | Robson | 336—176 |
| 2,720,579 | 10/55 | Morgan. | |
| 2,832,876 | 4/58 | Mucha | 219—10.79 |
| 2,767,296 | 10/56 | Welch. | |
| 2,769,076 | 10/56 | Bogdan. | |
| 2,879,489 | 3/59 | Mitchell | 336—134 |
| 2,910,569 | 10/59 | Boddy. | |
| 2,943,176 | 6/60 | Holtkamp. | |
| 3,005,969 | 10/61 | Wysocki | 336—134 |
| 3,032,705 | 5/62 | Olsen | 336—135 |
| 3,069,087 | 12/62 | Thomas | 219—204 |

RICHARD M. WOOD, *Primary Examiner.*

WALTER STOLWEIN, *Examiner.*